(12) United States Patent
Lakshmanamurthy et al.

(10) Patent No.: US 9,753,875 B2
(45) Date of Patent: Sep. 5, 2017

(54) SYSTEMS AND AN APPARATUS WITH A SIDEBAND INTERFACE INTERCONNECTING AGENTS WITH AT LEAST ONE ROUTER

(71) Applicant: Intel Corporation, Santa Clara, CA (US)

(72) Inventors: Sridhar Lakshmanamurthy, Sunnyvale, CA (US); Mikal C. Hunsaker, El Dorado Hills, CA (US); Michael T. Klinglesmith, Portland, OR (US); Blaise Fanning, Folsom, CA (US); Mohan K. Nair, Portland, OR (US); Joseph Murray, Scottsdale, AZ (US); Rohit R. Verma, Fremont, CA (US); Gary J. Lavelle, Newtown, PA (US); Robert P. Adler, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/001,330

(22) Filed: Jan. 20, 2016

(65) Prior Publication Data
US 2016/0132447 A1 May 12, 2016

Related U.S. Application Data

(60) Division of application No. 14/209,207, filed on Mar. 13, 2014, now Pat. No. 9,270,576, which is a (Continued)

(51) Int. Cl.
*G06F 13/364* (2006.01)
*H04L 12/28* (2006.01)
(Continued)

(52) U.S. Cl.
CPC .......... *G06F 13/364* (2013.01); *G06F 13/385* (2013.01); *G06F 13/4265* (2013.01); (Continued)

(58) Field of Classification Search
CPC ............... G06F 13/364; G06F 13/4265; G06F 15/7825; G06F 13/385; G06F 15/7807; (Continued)

(56) References Cited

U.S. PATENT DOCUMENTS 6,330,647 B1  12/2001  Jeddeloh et al.
6,430,182 B1   8/2002  Oyama
(Continued)

FOREIGN PATENT DOCUMENTS

CN    1819555    8/2006
CN    1833415    9/2006
(Continued)

OTHER PUBLICATIONS

European Patent Office, Examination Report mailed May 12, 2016 in European Patent Application No. 12837432.9.
(Continued)

*Primary Examiner* — Omar Ghowrwal
(74) *Attorney, Agent, or Firm* — Trop, Pruner & Hu, P.C.

(57) ABSTRACT

In one embodiment, the present invention includes a method for receiving a request in a router from a first endpoint coupled to the router, where the request is for an aggregated completion. In turn, the router can forward the request to multiple target agents, receive a response from each of the target agents, and consolidate the responses into an aggregated completion. Then, the router can send the aggregated completion to the first endpoint. Other embodiments are described and claimed.

18 Claims, 9 Drawing Sheets

Related U.S. Application Data continuation of application No. 13/248,243, filed on Sep. 29, 2011, now Pat. No. 8,711,875.

(51) Int. Cl.
| | |
|---|---|
| *H04L 12/54* | (2013.01) |
| *H04L 12/701* | (2013.01) |
| *H04L 12/761* | (2013.01) |
| *G06F 15/78* | (2006.01) |
| *G06F 13/38* | (2006.01) |
| *G06F 13/42* | (2006.01) |

(52) U.S. Cl.
CPC ...... *G06F 15/7807* (2013.01); *G06F 15/7825* (2013.01); *H04L 12/28* (2013.01); *H04L 12/54* (2013.01); *H04L 45/00* (2013.01); *H04L 45/16* (2013.01); *G06F 2213/0038* (2013.01)

(58) Field of Classification Search
CPC . G06F 2213/0038; H04L 45/16; H04L 12/28; H04L 12/54; H04L 45/00
See application file for complete search history.

(56) References Cited

U.S. PATENT DOCUMENTS

| | | | |
|---|---|---|---|
| 6,469,982 | B1 | 10/2002 | Henrion et al. |
| 7,065,733 | B2 | 6/2006 | Goodnow et al. |
| 7,415,533 | B1 | 8/2008 | Lacroute et al. |
| 7,421,543 | B2 | 9/2008 | Suzuki |
| 8,069,286 | B1 | 11/2011 | Orthner et al. |
| 8,711,875 | B2 | 4/2014 | Lakshmanamurthy |
| 2003/0227926 | A1 | 12/2003 | Ramamurthy et al. |
| 2004/0208512 | A1 | 10/2004 | Peddanarappagari et al. |
| 2004/0218600 | A1 | 11/2004 | Alasti et al. |
| 2005/0010687 | A1 | 1/2005 | Dai |
| 2005/0120323 | A1 | 6/2005 | Goodnow et al. |
| 2006/0101179 | A1 | 5/2006 | Lee et al. |
| 2006/0277346 | A1 | 12/2006 | Doak et al. |
| 2009/0006165 | A1 | 1/2009 | Teh et al. |
| 2009/0248940 | A1 | 10/2009 | Marino et al. |
| 2009/0296624 | A1 | 12/2009 | Ryu et al. |
| 2009/0300245 | A1 | 12/2009 | Shoemaker et al. |
| 2009/0310616 | A1 | 12/2009 | Cummings et al. |
| 2010/0042606 | A1 | 2/2010 | Srivastava et al. |
| 2010/0106912 | A1 | 4/2010 | Cypher et al. |
| 2010/0220703 | A1 | 9/2010 | Farrugia et al. |
| 2010/0235675 | A1 | 9/2010 | Subramanian et al. |
| 2010/0250889 | A1 | 9/2010 | Fang et al. |
| 2010/0293304 | A1 | 11/2010 | Alexandron et al. |
| 2010/0312942 | A1 | 12/2010 | Blinick et al. |
| 2011/0032947 | A1 | 2/2011 | Brueggen |
| 2011/0238728 | A1 | 9/2011 | Nagarajao et al. |
| 2012/0051297 | A1 | 3/2012 | Lee et al. |
| 2012/0303842 | A1 | 11/2012 | Cardinell et al. |
| 2012/0303899 | A1 | 11/2012 | Ash et al. |
| 2013/0054845 | A1* | 2/2013 | Nimmala ............ G06F 13/4022 710/36 |
| 2013/0054856 | A1* | 2/2013 | Lim ...................... G06F 13/364 710/242 |
| 2013/0089095 | A1 | 4/2013 | Chen et al. |

FOREIGN PATENT DOCUMENTS

| | | |
|---|---|---|
| CN | 101267376 | 9/2008 |
| CN | 101558589 | 10/2009 |
| CN | 101873339 | 10/2010 |
| EP | 1328104 | 7/2003 |
| EP | 2216722 A2 | 8/2010 |
| JP | 2007-135035 | 5/2007 |
| WO | 2010102055 | 9/2010 |
| WO | 2010137572 | 12/2010 |

OTHER PUBLICATIONS

State Intellectual Property Office of The People's Republic of China, Office Action mailed Dec. 2, 2016 in Chinese Patent Application No. 201410373889.8.
U.S. Patent and Trademark Office, Office Action mailed Dec. 3, 2013, with Reply filed Feb. 26, 2014, in U.S. Appl. No. 13/248,234.
Japan Patent Office, Office Action mailed Nov. 24, 2015 in Japanese Patent Application No. 2015-002299.
European Patent Office, Extended European Search Report mailed Oct. 9, 2015 in European Patent Application No. 15177163.1.
China Patent Office, Office Action mailed Nov. 3, 2015 in Chinese Patent Application No. 201280047815.4.
China Patent Office, Office Action mailed Dec. 3, 2015 in Chinese Patent Application No. 201280058462.8.
European Search Report mailed Mar. 20, 2015, in European Patent Application No. 12837432.9.
U.S. Patent and Trademark Office, Final Office Action mailed Jun. 13, 2014, with Reply to Final filed Aug. 7, 2014 in U.S. Appl. No. 13/248,234.
U.S. Patent and Trademark Office, Final Office Action mailed Apr. 8, 2014, with Reply filed Jun. 6, 2014, in U.S. Appl. No. 13/248,252.
U.S. Patent and Trademark Office, Office Action mailed Apr. 23, 2014, with Reply filed Jul. 22, 2014, in U.S. Appl. No. 13/222,362.
U.S. Patent and Trademark Office, Office Action mailed Mar. 31, 2014, with Reply filed Jun. 26, 2014, in U.S. Appl. No. 13/222,354.
U.S. Patent and Trademark Office, Final Office Action mailed Jul. 7, 2014, with Reply filed Aug. 22, 2014 in U.S. Appl. No. 13/222,354.
U.S. Patent and Trademark Office, Office Action mailed Oct. 23, 2013, with Reply filed Jan. 22, 2014, in U.S. Appl. No. 13/306,244.
U.S. Patent and Trademark Office, Final Office Action mailed Apr. 30, 2014, with PreAppeal Request and Notice of Appeal filed Jul. 23, 2014 in U.S. Appl. No. 13/306,244.
PCI-SIG, "PCI Local Bus Specification, Revision 3.0," Feb. 3, 2004, 3 pages.
U.S. Appl. No. 14/326,654, filed Jul. 9, 2014, entitled "Common Idle State, Active State and Credit Management for an Interface", by Sridhar Lakshmanamurthy, et al.
U.S. Appl. No. 14/209,184, filed Mar. 13, 2014, entitled "Providing Multiple Decode Options for a System-on-Chip (SoC) Fabric", by Sridhar Lakshmanamurthy, et al.
U.S. Appl. No. 14/209,146, filed Mar. 13, 2014, entitled "Supporting Multiple Channels of a Single Interface", by Sridhar Lakshmanamurthy, et al.
U.S. Appl. No. 14/295,810, filed Jun. 4, 2014, entitled "Issuing Requests to a Fabric", by Sridhar Lakshmanamurthy, et al.
U.S. Patent and Trademark Office, Office Action mailed Jul. 22, 2014, in U.S. Appl. No. 14/295,810.
European Patent Office, European Office Action dated Mar. 29, 2017, in European Patent Application No. 12837432.9.
State Intellectual Property Office of The People's Republic of China, Second Office Action dated Jul. 26, 2017 in Chinese Patent Application No. 201410373889.8.

* cited by examiner

SYSTEMS AND AN APPARATUS WITH A SIDEBAND INTERFACE INTERCONNECTING AGENTS WITH AT LEAST ONE ROUTER

This application is a divisional of U.S. patent application Ser. No. 14/209,207, filed Mar. 13, 2014, now U.S. Pat. No. 9,270,576, issued Feb. 23, 2016, which is a continuation of U.S. patent application Ser. No. 13/248,243, filed Sep. 29, 2011, now U.S. Pat. No. 8,711,875, issued Apr. 29, 2014, the content of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

In many computer systems, an IP block or agent can send a broadcast or multicast request to many or all other agents within the system. When this request is for a read operation, the agent will receive a completion/reply for every agent or targeted agent in the system. It is thus the agent's responsibility to aggregate the status and the data of all of these completions. The sending of these multiple completions raises complexity for the requesting agent and consumes bandwidth and other resources.

DETAILED DESCRIPTION

Embodiments may be used to aggregate completions over a sideband interface. In this way, transmission of multiple unicast read requests in a sideband fabric can be avoided, e.g., when identical registers in multiple agents are to be read or multicast/broadcast completion status is to be determined. In some embodiments an initiating master agent can receive an aggregated completion responsive to a multicast or broadcast non-posted request from that initiating master agent. To identify a request for aggregated completions, a predetermined aggregation indicator may be included in the request. In some embodiments, this indicator may be a predetermined port identifier (ID) that is reserved for all endpoints initiating multicast/broadcast non-posted requests that request a single aggregated completion back from a fabric that couples agents together.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
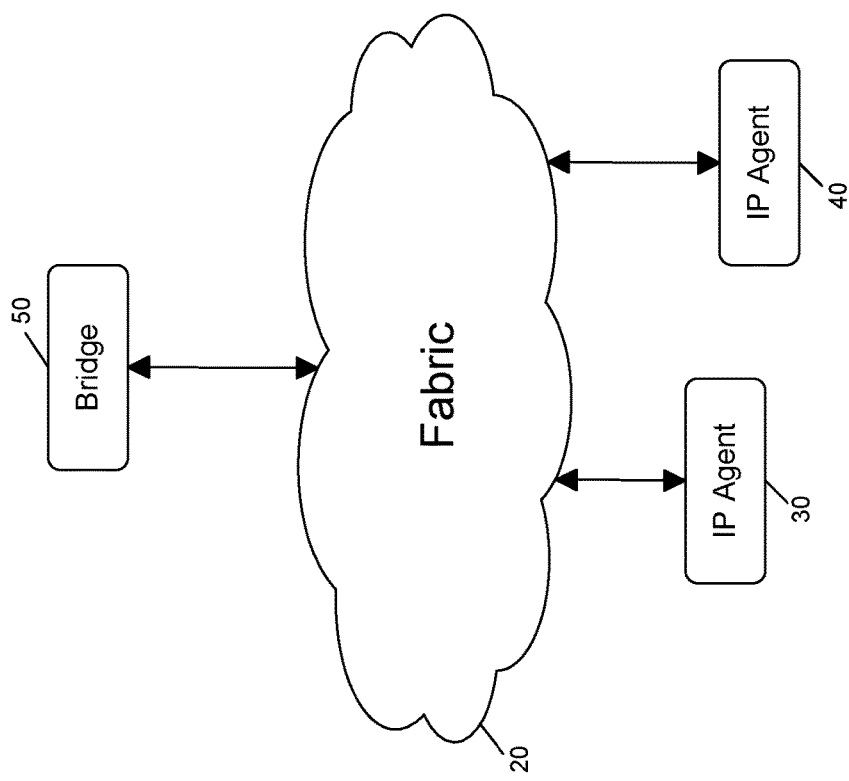
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
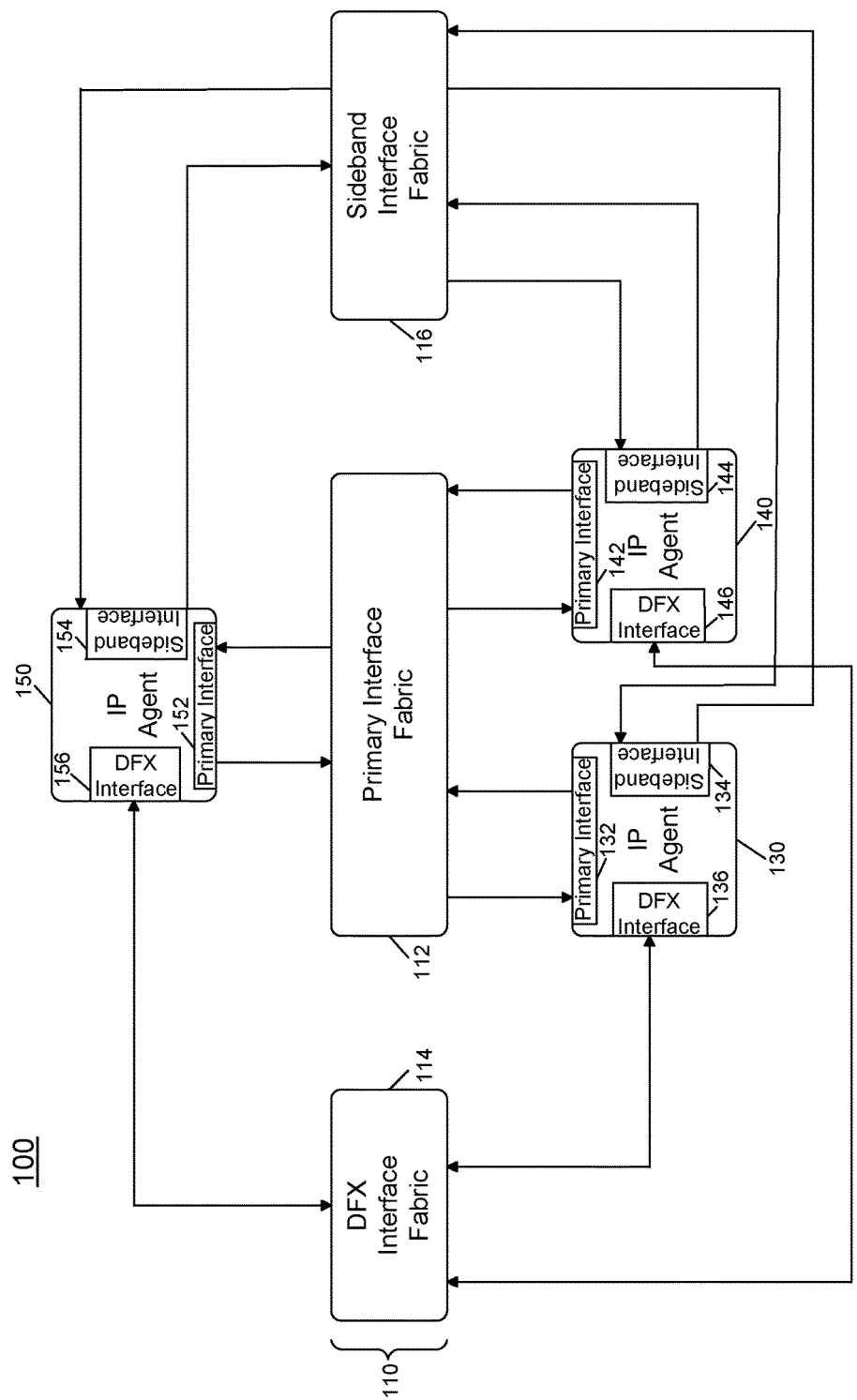
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (10), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
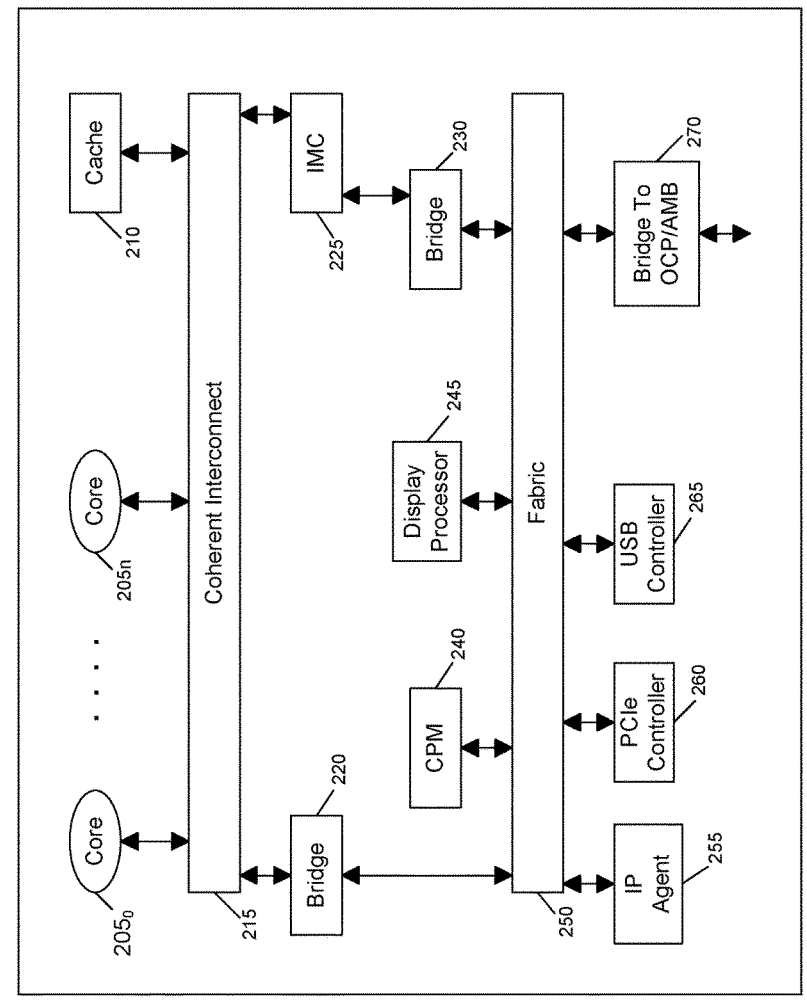
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
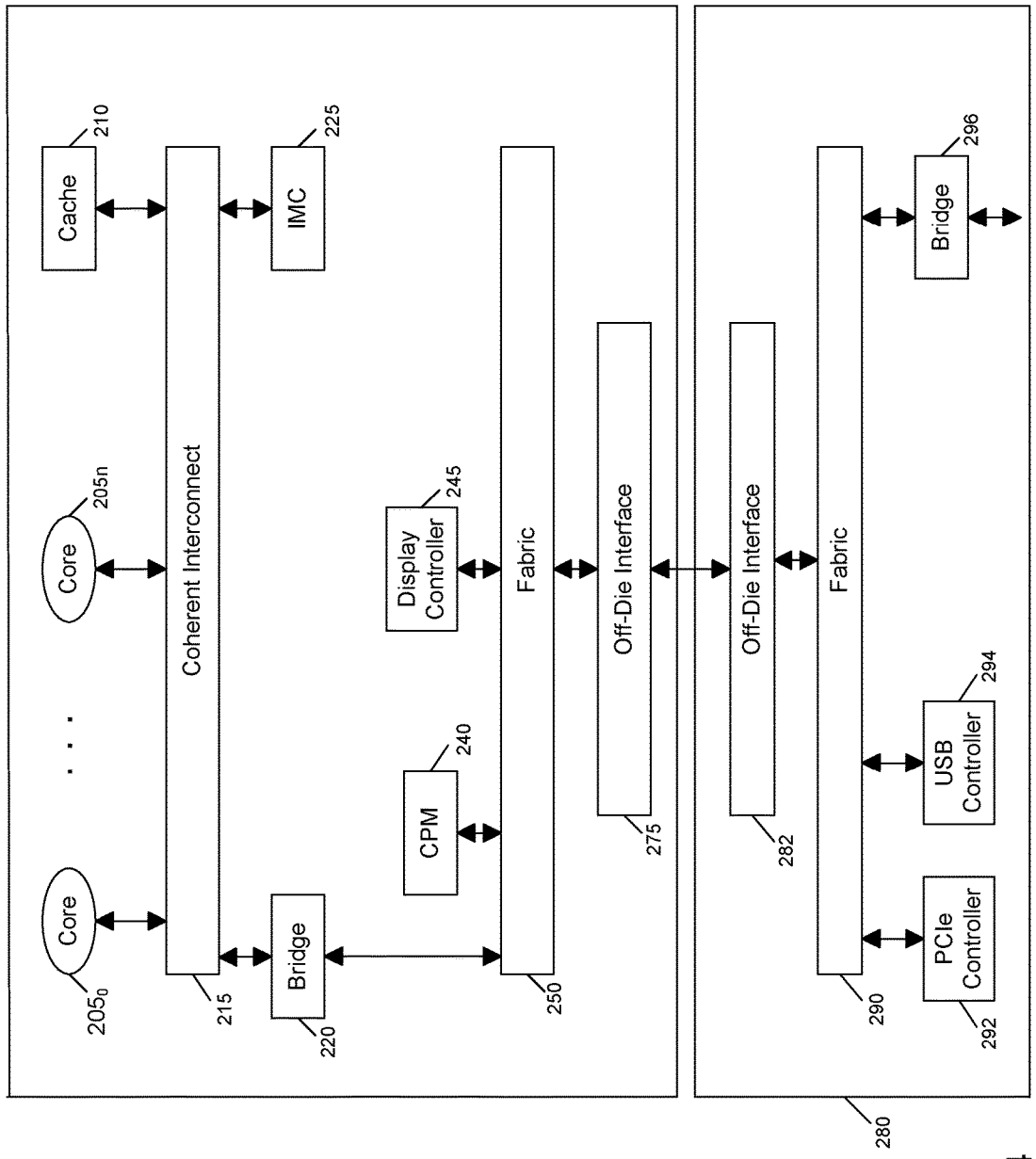
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
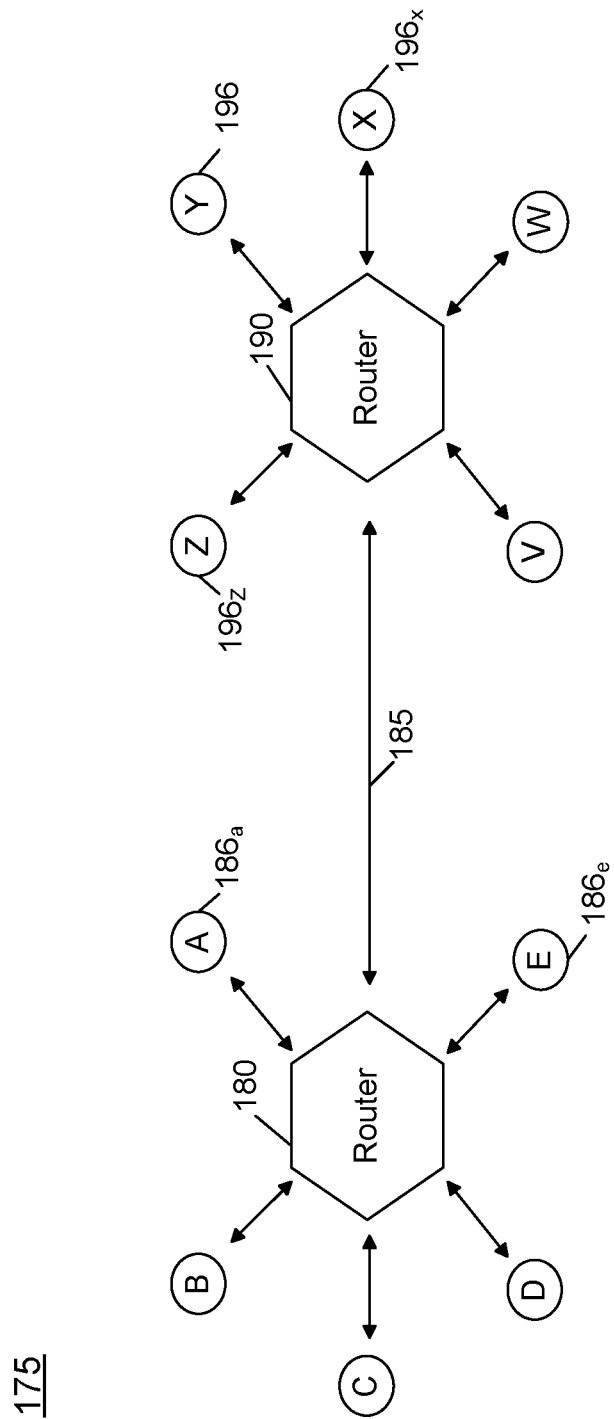
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

Figure 6:
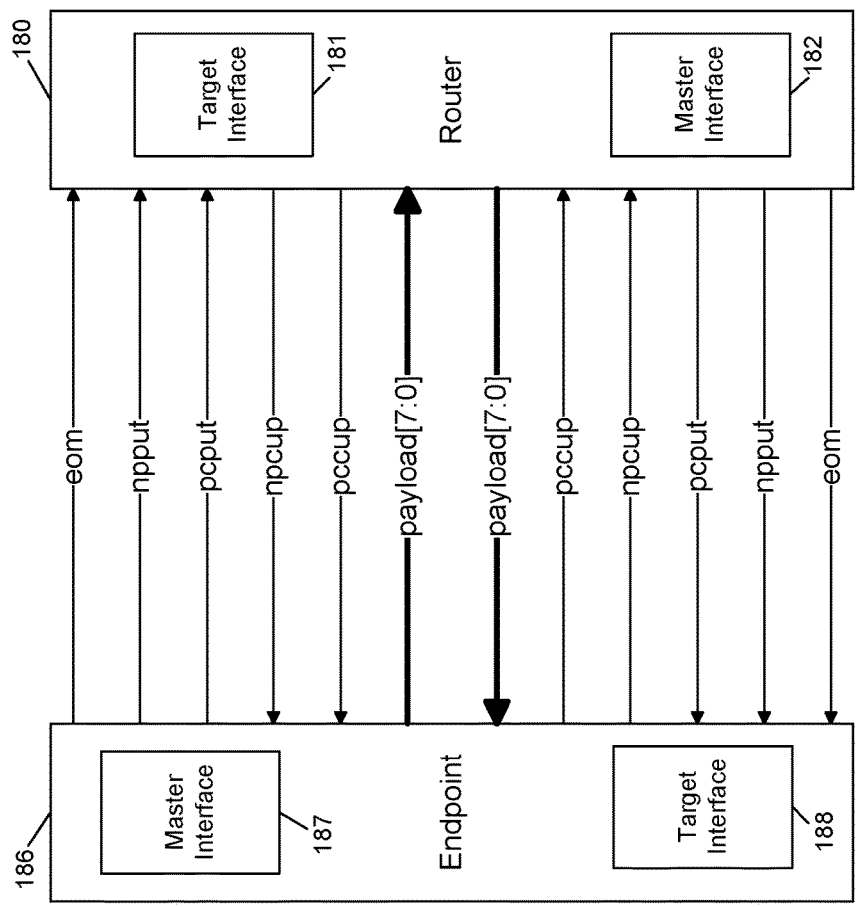
FIG. 6 is a block diagram of details of signaling available for a sideband interface in accordance with an embodiment of the present invention.

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation in the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

Aggregated completions may be used in various instances. For example, such completions can be used for register shadowing in multiple agents. If registers are shadowed in multiple agents, a master agent can issue a multicast read request to the shadow register in each of these agents and request an aggregated response. If the aggregated response does not match with its expected value of the register being shadowed, the agent can determine that the shadow update has yet to complete, or that an error has occurred. Another use case may be for reading duplicate status registers in multiple agents. For example, if multiple agents include one or more duplicate status registers that are updated on a given condition (e.g., a link status register of multiple PCIe lanes), a master agent can issue a multicast read to these status registers and request an aggregated response. The aggregated response thus provides an indication as to whether a specific condition has been updated in each of the status registers. A still further use case may be for determining completion status for a multicast/broadcast transaction.

In this example, an initiating master agent can send, e.g., a non-posted multicast/broadcast write transaction with a source identifier (ID) having a predetermined value (e.g., a source ID of FEh) that indicates that an aggregated response is requested, and in turn receive a single aggregated completion. A successful response status in the aggregated completion thus indicates to the initiating agent that the write message has successfully completed in all target agents.

Aggregated responses in accordance with an embodiment of the present invention may also be used to determine a power state of agents in the system. An initiating master can send a single non-posted multicast/broadcast write transaction with a source ID indicative of an aggregated response request (e.g., a source ID having a value of FEh) to query the power state of all agents in the system. If the completion is received with a power down status, then the master agent can determine that all agents were powered down. Likewise, if the completion is received with a successful status, the master agent can determine that all agents have power. Conversely, if the completion has a mixed status, the master agent can determine that the system has a mix of powered, unpowered, or otherwise misbehaving agents. And in some embodiments, each agent can have a pre-defined bit to set, such that when set, it is an indication of the agent having power and an identification of the agent. If the router completes the message for an agent, it would indicate the power down status and also not be able to set the agent's specific bit. Still other use cases may enable a multicast/broadcast read request with aggregation to avoid multiple unicast read requests.

Messages sent to a broadcast port ID or group port ID (multicast) may be either posted or non-posted. In the case of a non-posted operation, the sender can use the aggregate request indicator as its source port ID if it seeks aggregation of all completions by the fabric and agents with multiple port IDs. In other words, by using this specified port ID (e.g., 0xFE) as a source port ID within a request, a single completion is guaranteed to be returned to the sender responsive to the request. Thus when a non-posted request is sent with this aggregation source port ID, aggregated completions can be collected in the router coupled to the requester, and a single response status is returned.

In various embodiments, routers can apply a "bitwise OR" or a "multi-bit OR" operation to the completion response status they receive before sending the aggregated completion to the ingress port of the requesting agent. When aggregating completions with data, the data returned to the requester can be the bitwise OR of the corresponding data from each completer. If a combination of completion with data and completion without data responses are received by the router, then the aggregated completion can be formed as a completion with data message, where the aggregated response status field is the bitwise OR of the status fields of all received completion messages and the aggregated data is the bitwise OR of the data from all received completion with data messages. In some embodiments, a router may synthesize or create a completion for certain components. For example, a router can synthesize a response for a powered down endpoint, and in some embodiments the response for such endpoints can be considered as a received completion for the purposes of aggregation.

Sideband agents having multiple port IDs can send a single aggregated completion for non-posted messages received with an aggregation request. Such sideband agents with multiple port IDs that aggregate completions may operate similarly to a router with regard to aggregations. That is, such agents may follow all aggregation rules defined for routers.

Thus as a result of data aggregation in accordance with an embodiment of the present invention, an endpoint that initiates a broadcast or multicast can receive a completion with data response indicating successful, unsuccessful/not supported, powered down, or multicast mixed status.

In contrast to a conventional receipt and processing of separate responses in a requesting agent, embodiments may locate the responsibility for aggregation to a system's sideband routers, which may simplify agent design. And by placing this responsibility in the router, this functionality from multiple agents in the system can be aggregated into a shared object (the router), which may lead to a decrease in system gate count, and also simplify agent design by allowing each agent to be agnostic of the total size of the sideband network.

Embodiments thus enable aggregation via usage of an aggregation indicator (e.g., a predetermined port ID (e.g., network address)) as the source address to indicate to all routers in the system that they should aggregate completions. Responsive to detection of such a request, the system routers can aggregate both status and data for a given completion.

Figure 7:
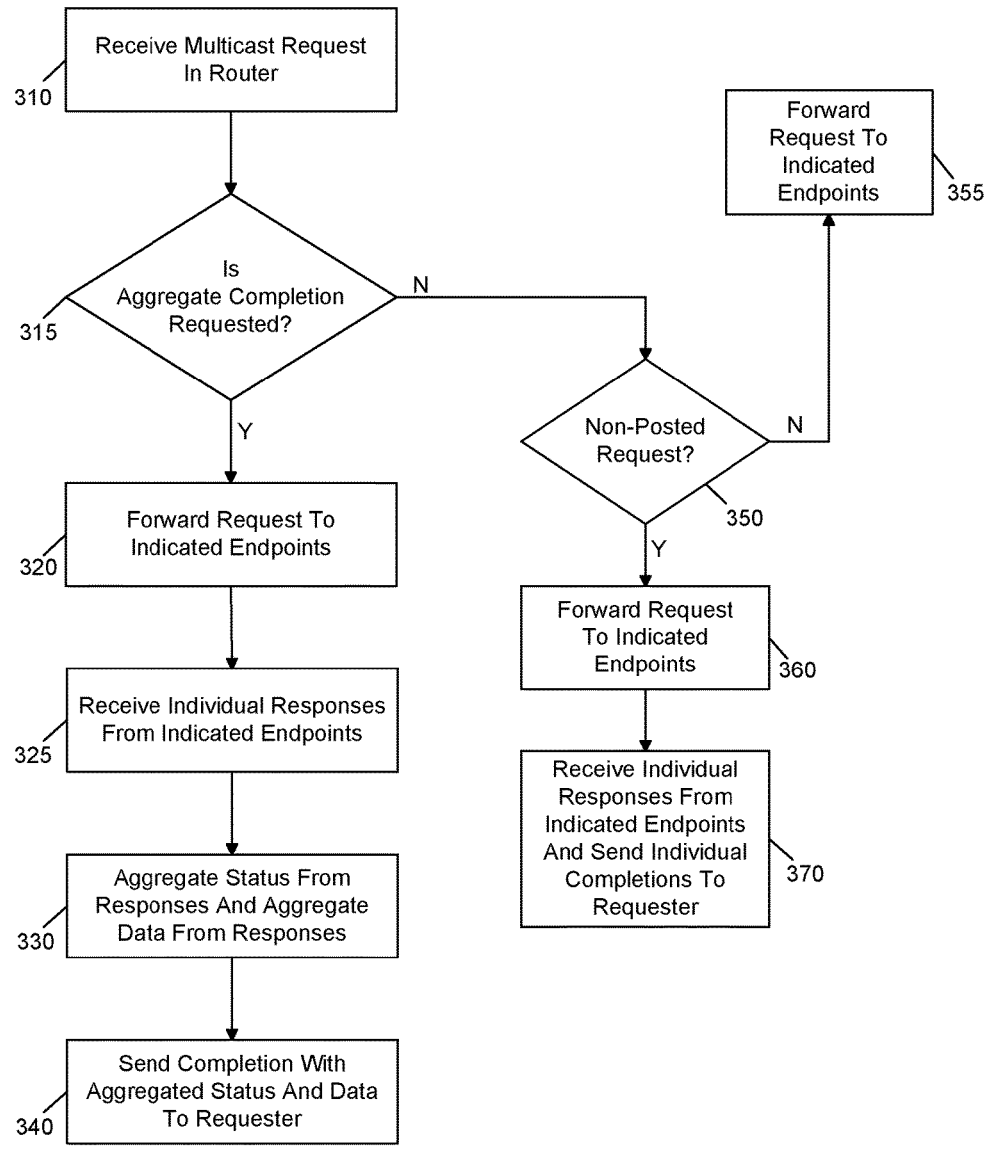
FIG. 7 is a flow diagram of a method of handling sideband completions in accordance with an embodiment of the present invention.

Referring now to FIG. 7, shown is a flow diagram of a method of handling sideband completions in accordance with an embodiment of the present invention. As shown in FIG. 7, method 300 may be implemented in a router, switch or other device that provides an aggregation function. For example, in some implementations an endpoint itself can perform a partial aggregation before sending an aggregated completion back to a requester. In the context of FIG. 7 however, it is assumed that the aggregator is a router. As seen in FIG. 7, method 300 may begin by receiving a multicast request in the router (block 310). This multicast request may come from a coupled endpoint, e.g., an IP agent coupled to the router. This multicast request can be a request that is directed to more than one agent of a SoC, or it can be a broadcast request directed to all agents of the SoC. At diamond 315 it can be determined whether an aggregate completion is requested. Although the scope of the present invention is not limited in this regard, in one embodiment this determination can be based on a source identifier associated with the request. That is, a predetermined source identifier value can thus provide this indication of an aggregated completion request. If such a request is received, as seen in FIG. 7 control passes to block 320.

At block 320, the router can forward the request to the indicated endpoints. For example, in a broadcast request the router can forward the request along to all system agents, while for a multicast request, the router can forward the request to the indicated agents. In some embodiments, the router can determine whether each agent has available resources, e.g., as determined with reference to a credit counter, before sending the requests along.

Still referring to FIG. 7, next at block 325 individual responses can be received at the router from the indicated endpoints. Note that although shown in FIG. 7 as receiving an individual response from each endpoint, as discussed above in an embodiment in which an endpoint includes multiple ports, the endpoint can aggregate responses from these multiple ports prior to sending its individual response. Or, another router element may aggregate responses for its coupled agents.

Control then passes to block 330 where the status from these individual responses can be aggregated. More specifically in one embodiment aggregation logic of the router can operate to aggregate status information and data information separately, e.g., by respective bitwise operations. Of course, rather than a single bit from each individual response, the bitwise ORs may be of multi-bit length. Control then passes to block 340, where a completion can be sent back to the requesting agent with aggregated status and data.

If instead at diamond 315 it is determined that an aggregated completion is not requested, control passes to diamond 350 where it can be determined whether the received request is a non-posted request. If not (that is, the request is a posted request), control passes to block 355 where the request can be forwarded to the indicated endpoints. If instead, the request is a non-posted request, it is forwarded to the indicated endpoints at block 360. Thereafter, individual responses can be received from the indicated endpoints and individual completions can be sent back to the requester (block 370). Thus as seen in FIG. 7, more efficient processing can be realized by aggregating completions in a router, and thus sending a single completion back to the requester, rather than the bandwidth, latency and other delays associated with sending individual completions from every indicated endpoint. Although shown with this particular implementation in the embodiment of FIG. 7, understand the scope of the present invention is not limited in this regard.

Figure 8:
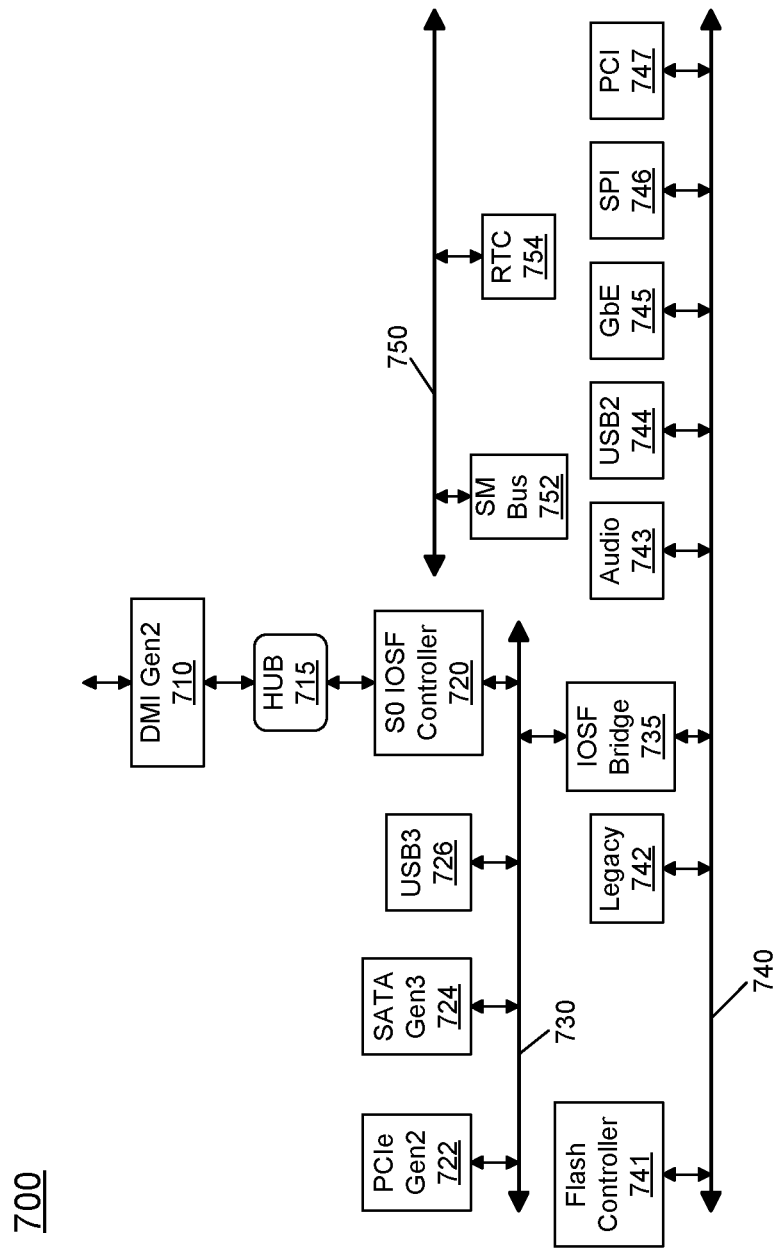
FIG. 8 is a more detailed block diagram of a portion of a SoC in accordance with an embodiment of the present invention.

Although the SoCs of FIGS. 3 and 4 are at a high level, understand that additional functionality may be present. Referring now to FIG. 8, shown is a more detailed block diagram of a portion of a SoC in accordance with an embodiment of the present invention. As shown in FIG. 8, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 8, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 8, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 8, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 8, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 8, understand the scope of the present invention is not limited in this regard.

Figure 9:
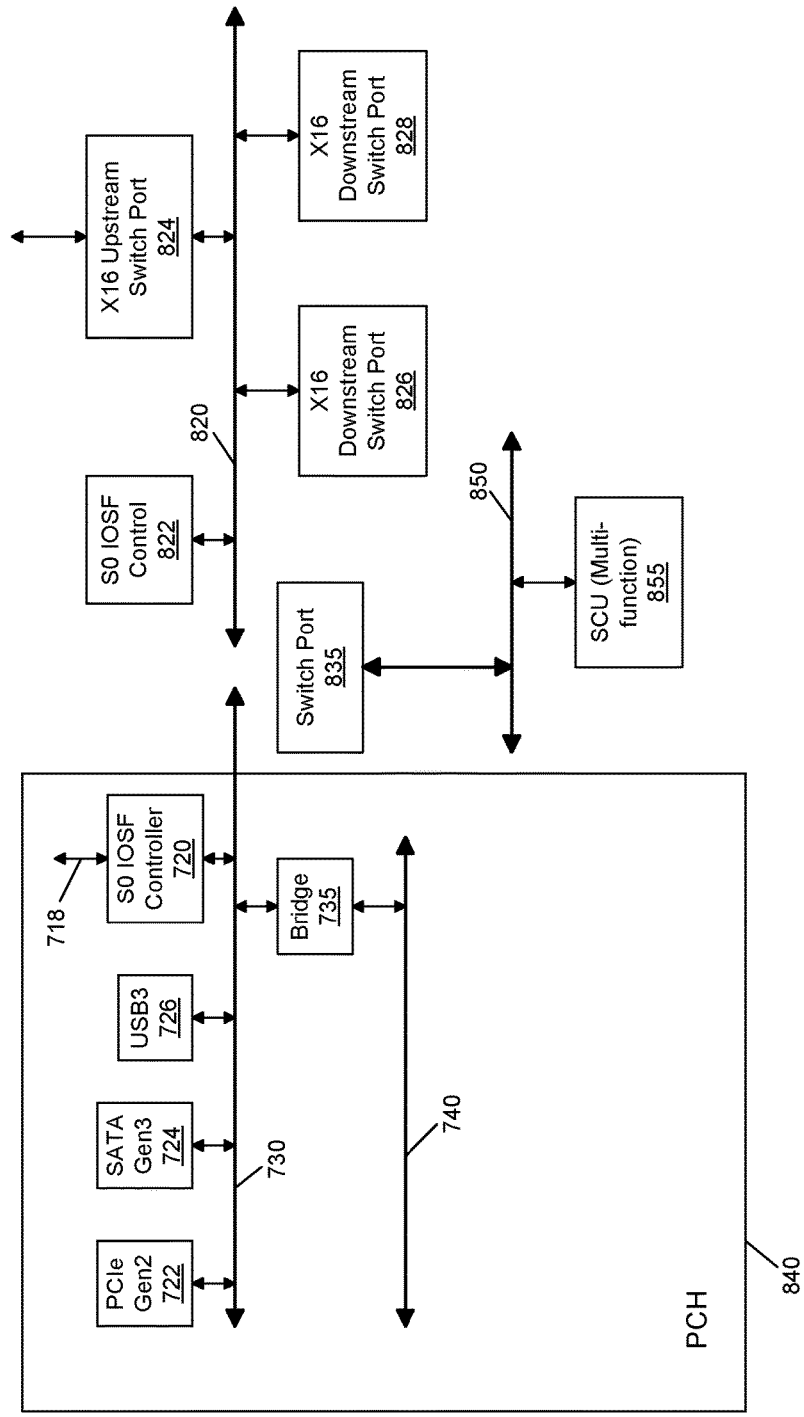
FIG. 9 is a block diagram of another SoC in accordance with an embodiment the present invention.

Still other implementations are possible. Referring now to FIG. 9, shown is a block diagram of another SoC in accordance with an embodiment the present invention. As shown in FIG. 9, SoC 800 may be configured for use, e.g., in server systems. As seen in FIG. 8, SoC may include a platform controller hub (PCH) 840, which may generally include components such as seen in the embodiment of FIG. 8. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 9).

As further seen in FIG. 9, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on chip (SoC) comprising:
at least one core to execute instructions;
a coherent interconnect coupled to the at least one core;
a memory controller coupled to the coherent interconnect;
a fabric coupled to the coherent interconnect;
a plurality of agents coupled to the fabric; and
a sideband message interface to interconnect the plurality of agents with at least one router, wherein at least one of the plurality of agents is to generate a request to obtain an aggregated response, the request including a predetermined port identifier reserved for issuance of aggregation requests.

2. The SoC of claim 1, further comprising a bridge coupled to the fabric to communicate with at least one component.

3. The SoC of claim 2, wherein the at least one component is of an open core protocol (OCP) or an ARM advanced microcontroller bus architecture (AMBA) protocol.

4. The SoC of claim 1, wherein the at least one core comprises a first in-order core and a first out-of-order core.

5. The SoC of claim 1, further comprising a portable computing system including the SoC.

6. A system comprising:
a system on chip (SoC) comprising:
at least one core to execute instructions;
a coherent interconnect coupled to the at least one core;
a memory controller coupled to the coherent interconnect;
a fabric coupled to the coherent interconnect;
a plurality of agents coupled to the fabric; and a sideband message interface to interconnect the plurality of agents with at least one router, wherein at least one of the plurality of agents is to generate a request to obtain an aggregated response, the request including a predetermined port identifier reserved for issuance of aggregation requests; and a system memory coupled to the SoC.

7. The system of claim 6, wherein the SoC further comprises a bridge coupled to the fabric to communicate with at least one component.

8. The system of claim 7, wherein the at least one component is of an open core protocol (OCP) or an ARM advanced microcontroller bus architecture (AMBA) protocol.

9. The system of claim 6, wherein the at least one core comprises a first in-order core and a first out-of-order core.

10. The system of claim 6, wherein the system comprises a portable computing system.

11. An apparatus comprising:
at least one core to execute instructions;
a coherent interconnect coupled to the at least one core;
a memory controller coupled to the coherent interconnect;
a fabric coupled to the coherent interconnect;
a plurality of agents coupled to the fabric;
a sideband message interface to interconnect the plurality of agents with at least one router, wherein at least one of the plurality of agents is to generate a request to obtain an aggregated response, the request including a predetermined port identifier reserved for issuance of aggregation requests; and the at least one router including an aggregation logic, responsive to the request, to combine a plurality of responses from at least some of the plurality of agents into a combined response and send the combined response to the at least one of the plurality of agents.

12. The apparatus of claim 11, wherein the request includes an aggregation indicator corresponding to the predetermined port identifier.

13. The apparatus of claim 11, wherein responsive to the request, the router is to obtain a status of at least some of the plurality of agents.

14. The apparatus of claim 11, wherein responsive to the request, the router is to obtain a status of a first agent that is powered down.

15. The apparatus of claim 11, wherein the router is to synthesize a completion for at least one of the plurality of agents.

16. The apparatus of claim 15, wherein the router is to synthesize the completion when the at least one agent is powered down.

17. The apparatus of claim 11, wherein the aggregation comprises a non-posted request.

18. The apparatus of claim 11, wherein the request comprises a broadcast or multicast transaction.

* * * * *